United States Patent
Woicekowski

(10) Patent No.: US 9,764,842 B2
(45) Date of Patent: Sep. 19, 2017

(54) STORAGE CAPACITY STATUS INDICATOR AND ASSOCIATED SYSTEMS AND METHODS

(71) Applicant: The Boeing Company, Chicago, IL (US)

(72) Inventor: Michael J. Woicekowski, Montreal (CA)

(73) Assignee: The Boeing Company, Chicago, IL (US)

( * ) Notice: Subject to any disclaimer, the term of this patent is extended or adjusted under 35 U.S.C. 154(b) by 184 days.

(21) Appl. No.: 14/709,188

(22) Filed: May 11, 2015

(65) Prior Publication Data

US 2016/0332729 A1 Nov. 17, 2016

(51) Int. Cl.
| | | |
|---|---|---|
| *B64D 45/00* | (2006.01) | |
| *B64D 11/00* | (2006.01) | |
| *G08B 5/00* | (2006.01) | |
| *G08B 5/02* | (2006.01) | |

(52) U.S. Cl.
CPC ............ *B64D 11/003* (2013.01); *B64D 45/00* (2013.01); *B64D 11/00* (2013.01); *G08B 5/00* (2013.01); *G08B 5/02* (2013.01)

(58) Field of Classification Search
CPC . G08B 5/00; G08B 5/02; B64D 11/00; B64D 11/003; B64D 45/00
USPC ......... 116/86, 200, 201, 281, 284–285, 209; 40/459–460, 491–493, 606.07, 907
See application file for complete search history.

(56) References Cited

U.S. PATENT DOCUMENTS

| | | | | | |
|---|---|---|---|---|---|
| 2,439,696 | A | * | 4/1948 | Schaal | F17C 13/003 116/313 |
| 3,748,767 | A | * | 7/1973 | Giesecke | G09F 7/00 40/491 |
| 4,654,990 | A | * | 4/1987 | Suters | G09F 11/00 40/488 |
| 4,703,712 | A | * | 11/1987 | Christman | H01H 15/025 116/321 |
| 4,794,877 | A | * | 1/1989 | Pollard-Smith | G08B 5/00 116/321 |
| 4,881,335 | A | * | 11/1989 | Khoshkish | G09F 11/04 116/204 |
| 5,046,273 | A | * | 9/1991 | Virvo | G09F 15/0062 40/571 |
| 5,255,462 | A | * | 10/1993 | Rufenacht | G09F 7/10 40/488 |
| D343,583 | S | * | 1/1994 | Rossin | D10/49 |

(Continued)

FOREIGN PATENT DOCUMENTS

EP 348130 A2 12/1989

OTHER PUBLICATIONS

European Search Report for EP Application No. 16158080.8 dated Oct. 28, 2016.

*Primary Examiner* — R. A. Smith
*Assistant Examiner* — Tania Courson
(74) *Attorney, Agent, or Firm* — Kunzler Law Group, PC

(57) ABSTRACT

Described herein is a system for a mobile platform includes a storage compartment that defines an interior space. The storage compartment forms part of the mobile platform. Further, the storage compartment is operable to physically separate the interior space from an exterior space. The system also includes a visual indicator that provides to the exterior space a visual indication of a storage capacity status of the interior space of the storage compartment.

21 Claims, 9 Drawing Sheets

(56) References Cited

U.S. PATENT DOCUMENTS

| | | | | |
|---|---|---|---|---|
| 5,839,458 A * | 11/1998 | Delcarson | ............... | G01D 5/04 |
| | | | | 116/216 |
| 6,490,818 B1 * | 12/2002 | Bramhall | ............... | A47G 1/065 |
| | | | | 116/323 |
| 6,598,829 B2 * | 7/2003 | Kamstra | ............... | B64D 11/003 |
| | | | | 244/118.1 |
| 6,978,565 B1 * | 12/2005 | Tollius | ............... | G09F 11/00 |
| | | | | 283/99 |
| 7,302,150 B2 * | 11/2007 | Druckman | ............ | B64D 11/003 |
| | | | | 385/134 |
| 7,552,954 B2 * | 6/2009 | Rozo | ............ | E05B 5/00 |
| | | | | 292/143 |
| 7,571,694 B2 * | 8/2009 | Boerner | ............ | G08B 5/36 |
| | | | | 116/204 |
| 7,893,645 B2 * | 2/2011 | Kneller | ............ | B64D 11/003 |
| | | | | 312/248 |
| 7,937,169 B2 | 5/2011 | Kneller et al. | | |
| 8,297,217 B2 * | 10/2012 | Hsu | ............ | H01H 9/16 |
| | | | | 116/2 |
| 8,316,790 B2 * | 11/2012 | Coon | ............ | G09F 9/302 |
| | | | | 116/321 |
| 8,484,872 B2 * | 7/2013 | Blue | ............ | G09F 7/10 |
| | | | | 40/488 |
| 8,695,254 B2 * | 4/2014 | Bell | ............ | G09F 7/10 |
| | | | | 116/324 |
| 9,015,975 B2 * | 4/2015 | Blue | ............ | G09F 7/10 |
| | | | | 40/488 |
| 9,299,270 B2 * | 3/2016 | Hosilyk | ............ | G09F 3/00 |
| 2004/0056779 A1 * | 3/2004 | Rast | ............ | B63B 22/16 |
| | | | | 340/985 |
| 2008/0078869 A1 | 4/2008 | Kneller et al. | | |
| 2008/0251640 A1 | 10/2008 | Johnson et al. | | |

\* cited by examiner

STORAGE CAPACITY STATUS INDICATOR AND ASSOCIATED SYSTEMS AND METHODS

FIELD

This disclosure relates to boarding a mobile platform for the transport of passenger, and more particularly to tracking the storage capacity status of storage compartments of a mobile platform.

BACKGROUND

Boarding a mobile platform, such as a commercial aircraft, often involves the storage of luggage in storage compartments of the mobile platform. When storage compartments are closed, the contents of the storage compartments and the capacity of the storage compartments to store additional luggage is unknown. To ascertain the contents or storage capacity status of a closed storage compartment, the storage compartment must be opened. Repeatedly opening and closing storage compartments during the boarding process may not be time efficient. Additionally, efficiency may be lessened when crew and passengers are moving about a passenger area of the mobile platform looking for available storage compartments.

SUMMARY

The subject matter of the present application has been developed in response to the present state of the art, and in particular, in response to the problems and needs associated with boarding a mobile platform. In general, the subject matter of the present application has been developed to provide apparatuses, systems, and methods for providing visual indications of the storage capacity status of closed storage compartments that overcome at least some of the above-discussed shortcomings of the prior art.

According to one embodiment, a first system for a mobile platform includes a storage compartment that defines an interior space. The storage compartment forms part of the mobile platform. Further, the storage compartment is operable to physically separate the interior space from an exterior space. The system also includes a visual indicator that provides to the exterior space a visual indication of a storage capacity status of the interior space of the storage compartment.

In one implementation of the first system, the visual indicator includes a mechanical display that is switchable between at least a first configuration indicating a first storage capacity status of the interior space of the storage compartment and a second configuration indicating a second storage capacity status of the interior space of the storage compartment.

According to some implementations of the first system, the visual indicator includes a light. The light can be switchable between a first color indicating a first storage capacity status of the interior space of the storage compartment and a second color indicating a second storage capacity status of the interior space of the storage compartment.

According to certain implementations of the first system, the visual indicator includes an electronic display. The electronic display can display a percentage of a storage capacity of the interior space of the storage compartment.

In certain implementations of the first system, the visual indicator is coupled to the storage compartment. The storage compartment can include a movable partition where the movable partition at least partially defines the interior space. The visual indicator may be coupled to the movable partition.

According to some implementations, the first system further includes a volumetric sensor that detects the storage capacity status of the interior space of the storage compartment. The visual indicator can be operably coupled to the volumetric sensor to automatically provide the visual indication of the storage capacity status of the interior space of the storage compartment based on input from the volumetric sensor. The volumetric sensor may wirelessly transmit the input to the visual indicator.

In some implementations of the first system, the visual indicator includes a coloration system operably coupled to the storage compartment to switch a color of the storage compartment between a first color and a second color. The first color indicates a first storage capacity status of the interior space of the storage compartment and the second color indicates a second storage capacity status of the interior space of the storage compartment.

According to certain implementations of the first system, the visual indicator is remote from the storage compartment. The visual indicator is positioned in a crew work space of the mobile platform in one implementation. The visual indicator is positioned external to the mobile platform in one implementation. The visual indicator includes an electronic display of a mobile device.

In some implementations, the first system includes a plurality of storage compartments. Each of the storage compartments defines an interior space and each is operable to physically separate the interior space from the exterior space. The visual indicator provides to the exterior space a visual indication of the storage capacity status of the interior space of each of the plurality of storage compartments. The storage capacity status indicated by the visual indicator can include an average or aggregated storage capacity status of the plurality of storage compartments.

According to another embodiment, a second system for tracking a storage capacity status of a storage compartment of a mobile platform includes a volumetric sensor that detects the storage capacity status of the storage compartment. The second system also includes a control module that is operably coupled to the volumetric sensor to receive the storage capacity status from the volumetric sensor. Additionally, the second system includes a visual indicator that is operably coupled to the control module. The visual indicator provides a visual indication of the storage capacity status of the storage compartment in response to a command from the control module.

In yet a further embodiment, a method of tracking a storage capacity status of a storage compartment of a mobile platform includes detecting the storage capacity status of the storage compartment. The method also includes visually indicating the storage capacity status of the storage compartment based on the detected storage capacity status.

According to some implementations of the method, visually indicating the storage capacity status of the storage compartment includes visually indicating the storage capacity status of the storage compartment to a location external to the mobile platform.

A system for a mobile platform includes a storage compartment that defines an interior space. The storage compartment forms part of the mobile platform. The storage compartment includes a door that is movable relative to the interior space between an open position and a closed position. The door physically separates the interior space from an exterior space in the closed position. The system further includes a visual determination apparatus coupled to the storage compartment. The visual determination apparatus provides to the exterior space visual access to the interior space of the storage compartment when the door is in the closed position.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
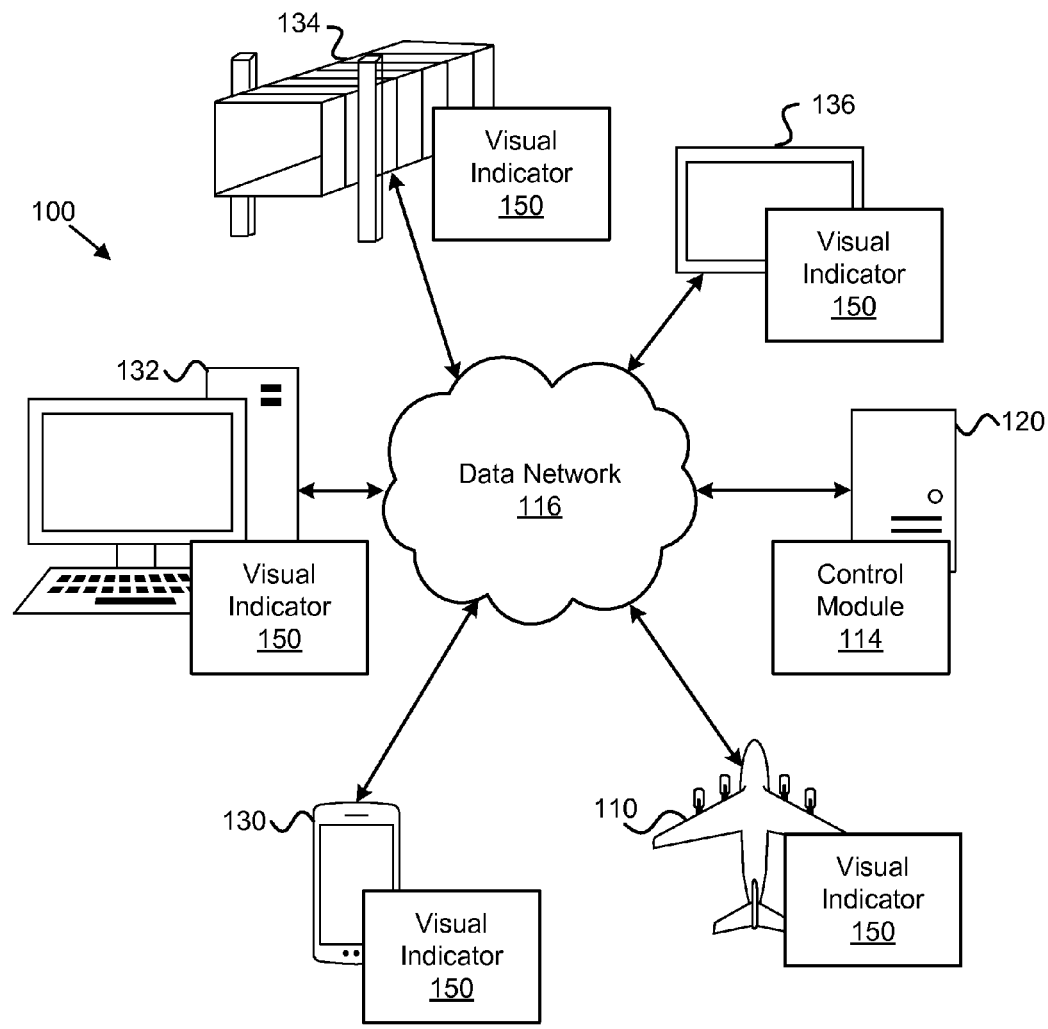
FIG. 1 is a schematic block diagram illustrating one embodiment of a system for tracking storage capacity status of a storage compartment on a mobile platform.

Referring to FIG. 1, and according to one embodiment, a system 100 for tracking the storage capacity status of a storage compartment on a mobile platform 110 is shown. Generally, the system 100 provides a visual indication of the storage capacity status of one or more storage compartments or bins on the mobile platform 110 to interested persons. The interested persons include passengers and/or crew traveling on the mobile platform 110, as well as non-traveling personnel associated with operation of the mobile platform 110. The visual indication of the storage capacity status of a storage compartment allows interested persons to know the storage capacity status of the storage compartment without opening the storage compartment. The ability to know the storage capacity status of a storage compartment without opening the storage compartment can promote the efficiency of the boarding process of a mobile platform. Also, in some implementations, the system 100 is operable to provide the visual indication of the storage capacity status of storage compartments even if the storage compartment is open (e.g., such as via a visual indicator above or below storage compartments), which may help when it is difficult to discern storage availability of an open compartment from a distance. The system 100 can promote the efficiency of the boarding process by reducing the time it takes to board the mobile platform.

More specifically, the boarding process can be accomplished more efficiently when the storage capacity status of storage compartments in the mobile platform is known in advance, and decisions regarding boarding procedure can be made before efficiency-depleting situations arise. For example, by knowing via one or more visual indicators 150 that storage space in storage compartments towards the back of an aircraft is unavailable, a passenger can make arrangements to store luggage in available storage compartments towards the front of the aircraft, or check luggage prior to boarding the aircraft, rather than obstruct the boarding process by navigating himself and his luggage along a busy aisle to the back of the aircraft only to return to the front of the aircraft. In some implementations, the system 100 informs the passenger, crew member, or non-traveling personnel of the storage capacity status of storage compartments on the aircraft while traveling to or through an airport, waiting in the boarding area of an airport, moving through a jetway towards the aircraft, standing in a galley area of the aircraft, or engaging in an activity other than physically opening a storage compartment.

As defined herein, the storage capacity status of a storage compartment is the availability of the storage compartment to store luggage. Generally, the availability of a storage compartment to store luggage is based on the amount of unoccupied or unused space within the storage compartment. Accordingly, the storage capacity status of a storage compartment is generally independent of, and unrelated to, the weight of luggage stored in the storage compartment. The storage capacity status of a storage compartment can be represented in any of various ways. For example, the storage capacity status of a storage compartment can be represented as a percentage of an overall storage capacity of the storage compartment that is unoccupied or unused. As another example, the storage capacity status of a storage compartment can be represented as the volume of the unoccupied or unused space in a storage compartment. In yet another embodiment, the storage capacity status of a storage compartment can be represented as usable space in the storage compartment. In some instances, although a storage compartment may have a relatively large quantity of unoccupied space, the unoccupied space may be distributed throughout the storage compartment in such a manner that relatively little of the unoccupied space is conducive for the storage of some luggage, such as luggage with relatively large volumetric dimensions. Accordingly, usable space can be defined according to the volumetric dimensions of unoccupied spaces in the storage compartment. In some implementations, the storage capacity status of a storage compartment is represented as the largest volumetric dimension of an unoccupied space in the storage compartment.

The system 100 includes the mobile platform 110 and at least one visual indicator 150. In some implementations, the system 100 includes at least one visual indicator 150 internal to (e.g., directly coupled to or integrated into) the mobile platform 110. Alternatively, or additionally, the system 100 can include at least one visual indicator 150 external to the mobile platform 110. The mobile platform 110 can be any of various vehicles for transporting passengers that provide at least one storage compartment for storing luggage of the passengers. The system 100 is particularly effective for mobile platforms 110 that provide public transportation for large numbers of passengers. In the illustrated embodiments of the present disclosure, the mobile platform 110 is shown and described as a passenger airplane or airliner, and the environment external to the airplane is described as an airport. However, in other embodiments, the mobile platform 110 can be a helicopter or other aircraft operating within an airport environment, or other vehicle, such as a train, bus, and boat, operating in another environment that facilitates the boarding of passengers onto the vehicle.

Visual indicators 150 external to the mobile platform 110 are directly coupled to, or integrated into, one or more devices or objects. The devices or objects may be non-electronic or electronic. Referring to FIG. 1, some examples of electronic and non-electronic devices and objects are shown for exemplary purposes without limitation. The electronic devices may include any of various information handling devices, such as a mobile device 130, computer 132, and monitor 136. The mobile device 130 can be any of various mobile devices, such as laptop computers, tablet computers, smart phones, wearable devices (e.g., smart watches, optical head-mounted displays), and/or the like. The computer 132, likewise, can be any of various types of computers, such as desktop computers, laptop computers, tablet computers, and/or the like. The monitor 136 can be any of various types of visual display devices, such as televisions, computer monitors, projectors, and the like.

Additionally, the electronic devices of the system 100 may include various operating systems, such as different versions of mobile and desktop operating systems provided by Microsoft®, Apple®, Linux®, Android®, and/or the like. For example, the computer 132 may include a desktop computer executing a version of Apple OSX®, Microsoft Windows®, UNIX®, Linux, or the like. In certain embodiments, the electronic devices execute one or more different applications running within the operating systems. The electronic devices may also have various software and/or hardware configurations, which may include various methods of connecting to a data network 116, including Ethernet, Wi-Fi, Bluetooth®, near-field communication (NFC), and/or the like.

One example of an object is shown in FIG. 1. More specifically, an object of the system 100 may be a jetway 134 that extends between a gate of an airport and an aircraft. The jetway 134 provides a path along which passengers, crew, and personnel may walk between the aircraft and the gate, such as during boarding and deboarding of the aircraft. In some embodiments, although the visual indicator 150 may be coupled to, or integrated into, one or more objects, it is recognized that the visual indicator 150 can be coupled to, or integrated into, one or more electronic devices that is coupled to, or integrated into, one or more objects. For example, the visual indicator 150 may form part of a monitor 136 that is coupled to the jetway 134.

The system 100 also includes a control module 114 operatively coupled to an information handling device, such as server 120. The server 120 can include main frame computers, desktop computers, laptop computers, cloud servers, virtual servers, smart phones, tablet computers, microcontrollers, and/or the like. The server 120 may include computer readable storage media, such as hard disk drives, optical drives, non-volatile memory, RAM, or the like. Additionally, the servers 120 can be configured to store data in one or more data storage areas associated with the computer readable storage media, such as data repositories, databases, data partitions, and/or the like. The electronic devices and mobile platform 110 of the system 100 can be communicatively coupled to the server 120 through the data network 116. Moreover, the electronic devices and mobile platform 110 of the system 100 can be configured to access data stored on the server 120 through the data network 116.

The data network 116 of the system 100 can be a digital communication data network that transmits digital communications between the electronic devices, mobile platform 110, and/or server 120. In some implementations, the data network 116 may include a wireless network, such as a wireless telephone network, a local wireless network, such as a Wi-Fi network, a Bluetooth® network, a near-field communication (NFC) network, and the like. Additionally, the data network 116 may include a wide area network (WAN), a storage area network (SAN), a local area network (LAN), an optical fiber network, the Internet, an intranet, or other network known in the art. The data network 116 may include two or more networks. The data network 116 may include one or more servers, routers, switches, and/or other networking equipment. Further, the data network 116 may also include computer readable storage media, such as a hard disk drive, an optical drive, non-volatile memory, random access memory (RAM), or the like.

The system 100 determines the storage capacity status of one or more storage compartments on a mobile platform 110. The storage capacity status of each of the storage compartments can be determined manually, such as via manual observation by a crew member, or automatically, such as via a sensor. After manual or automatic determination of the storage capacity status of the storage compartments, one or more of the visual indicators 150 of the system 100 is controlled to visually indicate the determined storage capacity status of each of the storage compartments.

Control of the visual indicators 150 to visually indicate a storage capacity status can be performed manually or automatically. Generally, manual control of the visual indicators 150 may include inputting storage capacity statuses by a crew member into the system 100, such as via an interface of the control module 114, and the system autonomously operating the visual indicators 150 to visually indicate the storage capacity statuses inputted into the system. Alternatively, manual control of the visual indicators 150 can include a crew member manually operating the visual indicators 150 to visually indicate the storage capacity statuses manually observed by the same or other crew member. Automatic control of the visual indicators 150 may include providing storage capacity statuses to the control module 114 of the system 100 via a sensor, and the system autonomously operating the visual indicators 150 to visually indicate the storage capacity statuses inputted into the system. Autonomous operation of the visual indicators 150 can be performed by digitally communicating operational commands, including storage capacity status information, to the visual indicators 150 from the control module 114. The visual indicators 150 then visually indicate (e.g., display) storage capacity status information as commanded by the control module 114.

Figure 2:
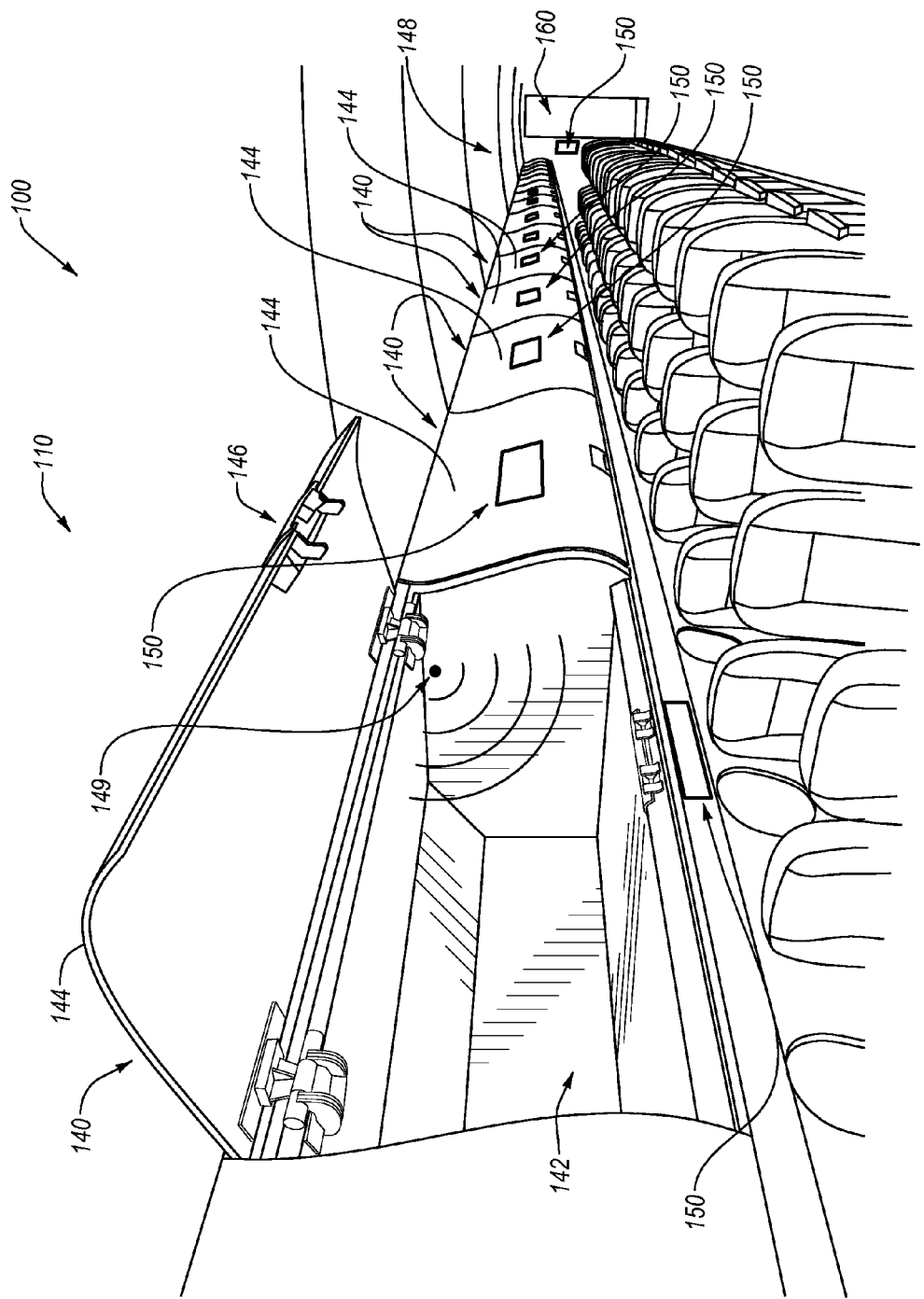
FIG. 2 is a partial perspective view illustrating one embodiment of a mobile platform of the system of FIG. 1.

Referring to FIG. 2, one embodiment of the system 100 is shown. In the illustrated embodiment of FIG. 2, the mobile platform 110 is an airplane with a plurality of storage compartments 140. The storage compartments 140 can be considered overhead bins as they are situated above the heads of seated passengers. Each of the storage compartments 140 defines an interior space 142 within which luggage may be stored. Further, each of the storage compartments 140 includes a door 144 or partition operable to open the storage compartment to allow access from an exterior space 148 within the mobile platform 110 to the interior space 142, and to close the storage compartment to enclose the interior space and prevent access to the interior space. With the door 144 closed, the storage compartment 140 physically separates the interior space 142 from the exterior space 148 of the mobile platform 110. Each door 144 includes a handle 146 operable to engage a locking mechanism to releasably secure the door 144 in place in a closed position.

The interior space 142 is defined by one or more stationary surfaces, and one or more movable surfaces when closed to enclose the interior space. The stationary surfaces may form part of rigid interior panels non-movably fixed to the mobile platform 110. The movable surfaces may form part of one or more rigid doors 144 or panels movably coupled to the mobile platform 110. The total storage capacity of each of the storage compartments 140 is defined according to the volume of the interior space 142 when the interior space is enclosed. More specifically, the total storage capacity of each of the storage compartments 140 can be equal to the volume of the interior space 142. In the illustrated embodiment, the interior space 142 is fixed relative to the mobile platform 110. However, in some implementations, the interior space 142 is defined primarily by the door, such that the interior space 142 is movable relative to the mobile platform 110.

The system 100 includes a visual indicator 150 for each of the storage compartments 140. Each of the visual indicators 150 can be positioned locally (e.g., non-remotely) above or below a respective storage compartment 140, including above or below the door 144 of the storage compartment. For example, as shown, one of the visual indicators 150 is positioned on an overhead bin support structure underneath one of the storage compartments 140 (e.g., the storage compartment with the opened door 144). Alternatively, or additionally, as shown, each of the visual indicators 150 can be positioned on the door 144 of a respective storage compartment 140 (e.g., the storage compartments with the closed doors). Whether above or below a storage compartment 140, or on a door 144 of a storage compartment, the visual indicators 150 positioned proximate to the storage compartments are visible when the doors of the respective storage compartments are closed.

According to some embodiments, each storage compartment 140 of the system 100 includes at least one volumetric sensor 149, obstruction sensor, or other sensor, which, depending on its configuration, detects free space or, conversely, obstructions, within the interior space 142. Based on the free space or obstructions detected by the volumetric sensor 149, a determination of the storage capacity status can be obtained. For example, in some implementations, by knowing an overall storage capacity of a storage compartment, the information obtained from the volumetric sensor 149 can be used to determine an overall storage capacity of the storage compartment that is used or unused. As another example, in certain implementations, the information obtained from the volumetric sensor 149 can be analyzed to determine the usable space of the storage compartment.

The determination of the storage capacity status can be calculated on-board the sensor 149 or off-board the sensor. For example, the sensor 149 may include a microcontroller that calculates the storage capacity status of the storage compartment 140. Alternatively, the visual indicator 150, control module 114, or other component may include a microcontroller or other computing devices to calculate the storage capacity status of the storage compartment 140 based on raw measurement data received from the volumetric sensor 149. Accordingly, the volumetric sensor 149 communicates, via a wired and/or wireless connection, the storage capacity status of the storage compartment and/or raw measurement data to the visual indicator 150 associated with the storage compartment (see, e.g., FIGS. 3-7), a visual indicator 150 associated with multiple storage compartments (see, e.g., FIG. 8), and/or a control module 114 of the system 100. Examples of volumetric sensors include, but are not limited to, ultrasonic range sensors and the like.

Although the mobile platform 110 according to some embodiments includes only multiple visual indicators 150 each associated with a respective storage compartment 140 on the mobile platform and positioned locally relative to the storage compartments, in other embodiments, the mobile platform 110 may include additional or alternative visual indicators 150 at other remote locations in the mobile platform 110. For example, as shown in FIG. 2, the mobile platform 110 includes a visual indicator 150 remote from the storage compartments 140 at a rear galley 160 or crew work space of the mobile platform, and may include a visual indicator at a front galley of the mobile platform. Visual indicators 150 at the front and/or rear galleys or crew work space of a mobile platform, or locations on a mobile platform other than adjacent respective storage compartments 140, may be particularly useful for crew members to quickly and easily determine the storage capacity status of multiple storage compartments without opening or physically inspecting the storage compartments. Also, passengers may inspect a visual indicator 150 at a front galley of the mobile platform 110 to determine which of multiple storage compartments may be available for storage prior to entering an aisle of the mobile platform.

Figure 3:
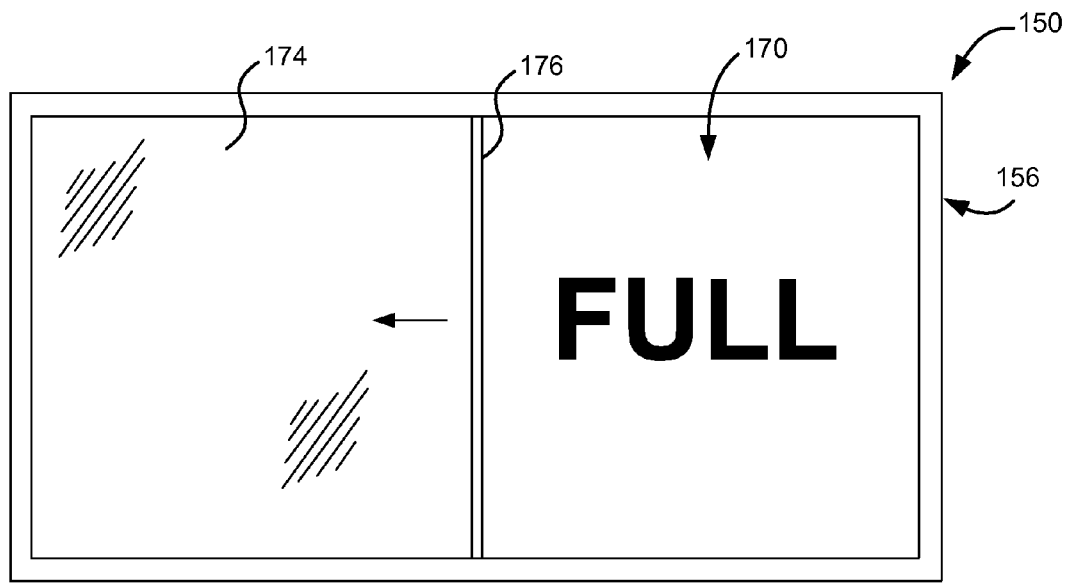
FIG. 3 is a front view illustrating one embodiment of a visual indicator of the system of FIG. 1.
Figure 4:
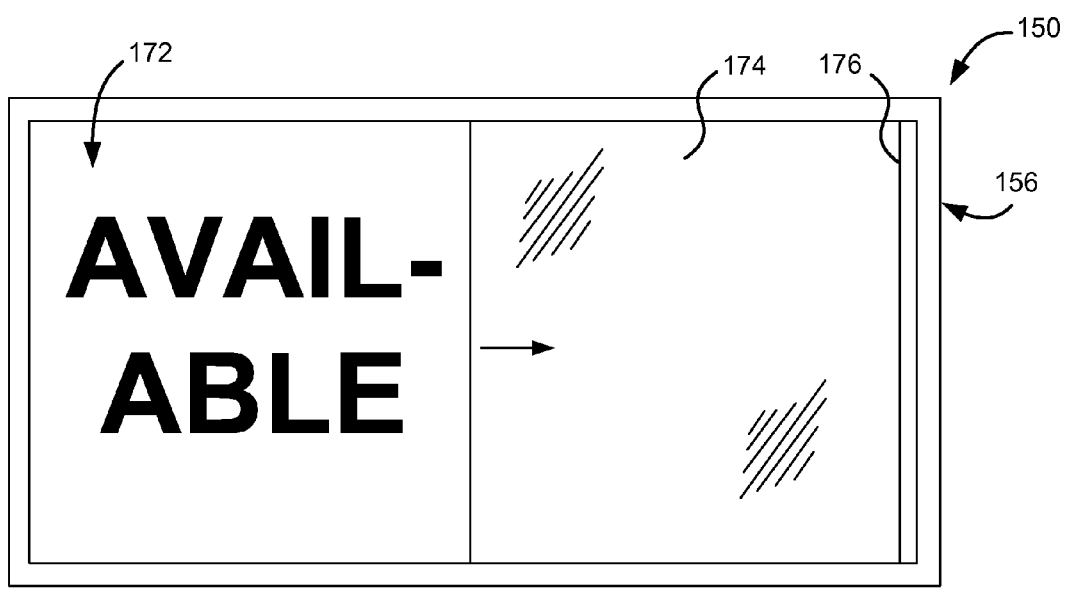
FIG. 4 is a front view illustrating one embodiment of the visual indicator of FIG. 3 shown in a different operational state.

Referring to FIGS. 3 and 4, the visual indicator 150 can be a mechanical display 156. The mechanical display 156 includes at least two indicia each representing one or two possible storage capacity statuses of a storage compartment. As shown, the mechanical display 156 includes a first storage capacity status indicia 170 (e.g., "FULL") on one side and a second storage capacity status indicia 172 (e.g., "AVAILABLE") on an adjacent side. The mechanical display 156 also includes a gate 174 that is movable relative to the first and second storage capacity status indicia 170, 172. The gate 174 is sized to cover, and block from view, one of the first and second storage capacity status indicia 170, 172 in one configuration, while allowing the other of the indicia to be visible in another configuration. More specifically, in a first configuration shown in FIG. 3, the gate 174, which can be made from an opaque material, covers the second storage capacity status indicia 172, but does not cover the first storage capacity status indicia 170. In contrast, in a second configuration shown in FIG. 4, the gate 174 covers the first storage capacity status indicia 170, but does not cover the second storage capacity status indicia 172. The gate 174 may include a tab 176, or other feature, that assists a user with moving the gate 174 between configurations.

Although the mechanical display 156 includes two storage capacity status indicia, in some embodiments, the mechanical display can include only one storage capacity status indicia or more than two storage capacity status indicia. The mechanical display 156 is operable by a crew member to manually switch the display between the first and second storage capacity status indicia based on the manually observation of the storage capacity status of a storage compartment.

Figure 5:
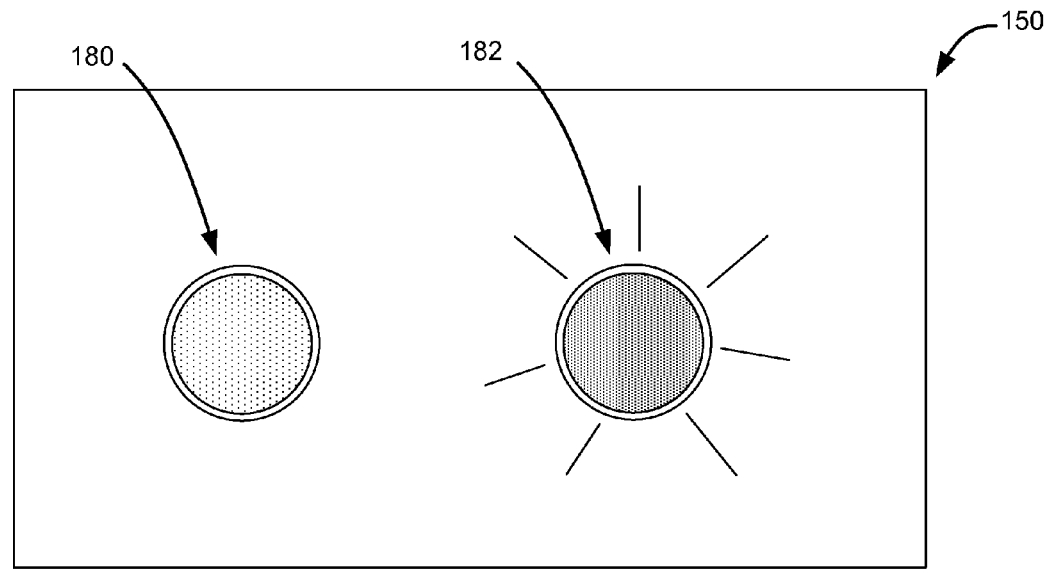
FIG. 5 is a front view illustrating one embodiment of a visual indicator of the system of FIG. 1.
Figure 6:
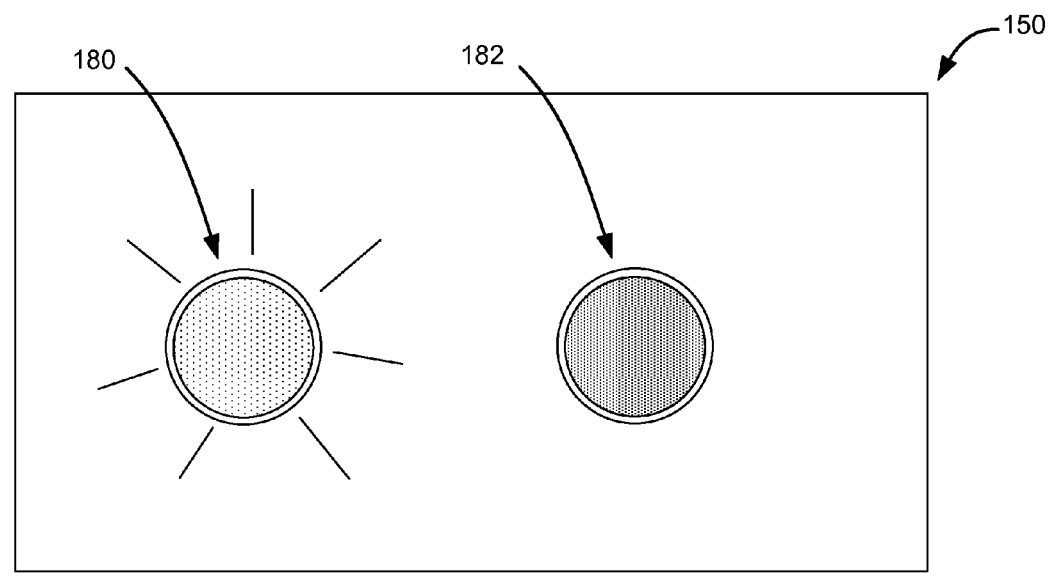
FIG. 6 is a front view illustrating one embodiment of the visual indicator of FIG. 5 shown in a different operational state.

Referring to FIGS. 5 and 6, the visual indicator 150 can include one or more lights operable to indicate a storage capacity status of a storage compartment. As shown, the visual indicator 150 includes first and second lights 180, 182. The first light 180, when lit or illuminated, may indicate a first storage capacity status of a storage compartment, and the second light 182, when lit or illuminated, my indicate a second storage capacity status of the storage compartment. Generally, during a boarding process of a mobile platform 110, either one or the other of the first and second lights 180, 182 is illuminated to indicate either the storage compartment is full or space in the storage compartment is available for luggage. As shown, the first light 180 is not illuminated and the second light 182 is illuminated in FIG. 5, while the first light 180 is illuminated and the second light 182 is not illuminated in FIG. 6. In some implementations, the first light 180 illuminates a different color than the second light 182. For example, the first light 180 may illuminate the color red to indicate the storage compartment is full, and the second light 182 may illuminate green to indicate the storage compartment is not full or space in the storage compartment is available for luggage. Although the visual indicator 150 of FIGS. 5 and 6 includes two lights 180, 182, in some embodiments, the visual indicator can include one light or more than two lights.

The first and second lights 180, 182 are non-concurrently illuminated, or concurrently non-illuminated when the system 100 is not in use or deactivated, by manual or automatic operation. In one embodiment, after a storage capacity status of a storage compartment is determined, whether by physical observation or a volumetric sensor 149, a user, such as a crew member, can manually activate one or the other of the first and second lights 180, 182, such as via a mechanical switch or a graphical user interface of a control module. In certain implementations, manual activation of the first and second lights 180, 182, or other type of visual indicator 150, may require the verification of proper security credentials. Alternatively, in some embodiments, one or the other of the first and second lights 180, 182 can be autonomously activated without manual input based on input from a volumetric sensor 149.

Figures 7, 8:
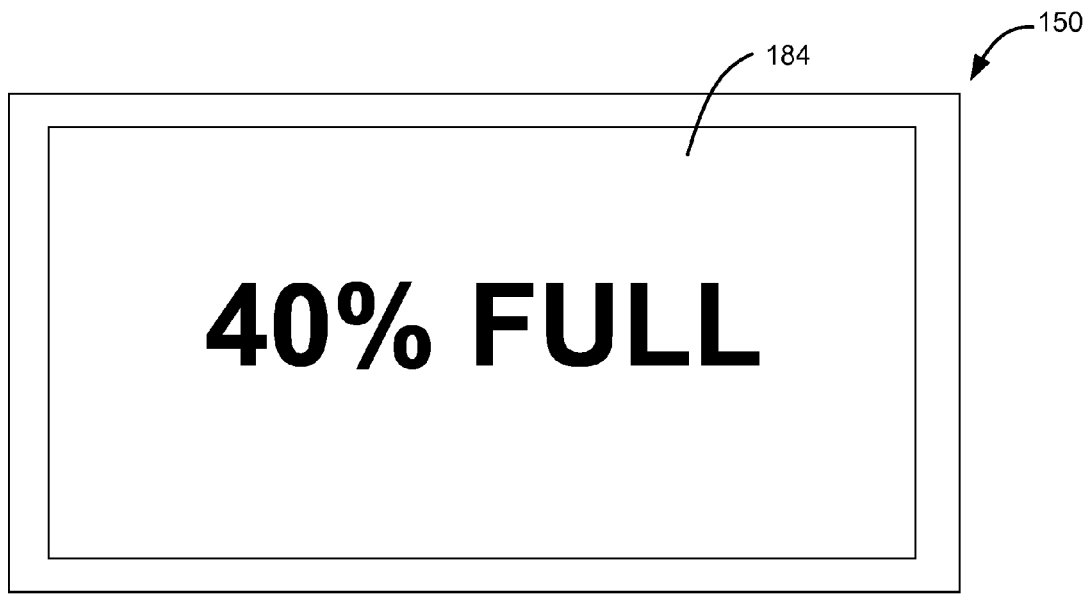
FIG. 7 is a front view illustrating one embodiment of a visual indicator of the system of FIG. 1.
FIG. 8 is a front view illustrating one embodiment of a visual indicator of the system of FIG. 1.

Referring to FIG. 7, the visual indicator 150 can be an electronic display 184 that displays a storage capacity status of a single storage compartment. The electronic display 184 displays the storage capacity status for a single storage compartment. The storage capacity status displayed by the electronic display 184 can be represented in any of various ways. In the illustrated embodiment, the electronic display 184 displays the storage capacity status alphanumerically as a percentage of the total storage capacity of the storage compartment that is full. Alternatively, the electronic display 184 can display the storage capacity status alphanumerically as a percentage of the total storage capacity of the storage compartment that is available. Other alphanumeric representations of the storage capacity status can be used as desired, such as one or the other of "FULL" and "AVAILABLE". Additionally, or alternatively, graphical representations (e.g., bars, graphs, charts, objects, etc.) can be used to indicate the storage capacity status of the storage compartment. The precision of the storage capacity status displayed by the electronic display is dependent on the precision of the volumetric sensor 149 in some implementations.

In some embodiments, the display of the storage capacity status on the electronic display 184 is controlled by automatic operation based on input from the volumetric sensor 149. However, in one embodiment, a user, such as a crew member, can manually control the electronic display 184.

Referring to FIG. 8, and according to one embodiment, the visual indicator 150 can be an electronic display 184 similar to the electronic display 184 of FIG. 8, but displaying the storage capacity status of multiple storage compartments and other associated information. For example, as shown in FIG. 8, the electronic display 184 displays a cumulative storage capacity status for different classes (e.g., first class and economy class) of seating on a mobile platform. Additionally, the electronic display 184 of FIG. 8 provides an indication of the storage compartments or bins within a given seating class that have space available for the storage of luggage. Although not shown in FIG. 8, in some embodiments, the individual storage capacity status (e.g., represented as percent full or percent available) for each of the available bins under 'Available Bins' can be listed next to the available bins. The display 184 of FIG. 8 may be helpful when placed in galleys, such as rear galley 160, of a mobile platform for use by crew and/or passengers to assist with the boarding process. It may also be useful for crew and/or passengers when placed adjacent to or on a door of a mobile platform.

Alphanumeric representations of the storage capacity statuses of multiple storage compartments other than those shown in FIG. 8 may be used as desired. Additionally, or alternatively, graphical representations can be used to indicate the storage capacity statuses of multiple storage compartments. Further, the display 184 of FIG. 8 may include other or alternative information that may be relevant for improving the efficiency of the boarding process with regards to the storage of luggage in storage compartments. Preferably, the display of the storage capacity status on the electronic display 184 of FIG. 8 is controlled automatically based on input from the volumetric sensors of each of the storage compartments. In other words, the inputs from multiple volumetric sensors of multiple storage compartments are used to display the storage capacity statuses of the storage compartments individually or as groups.

Figure 9:
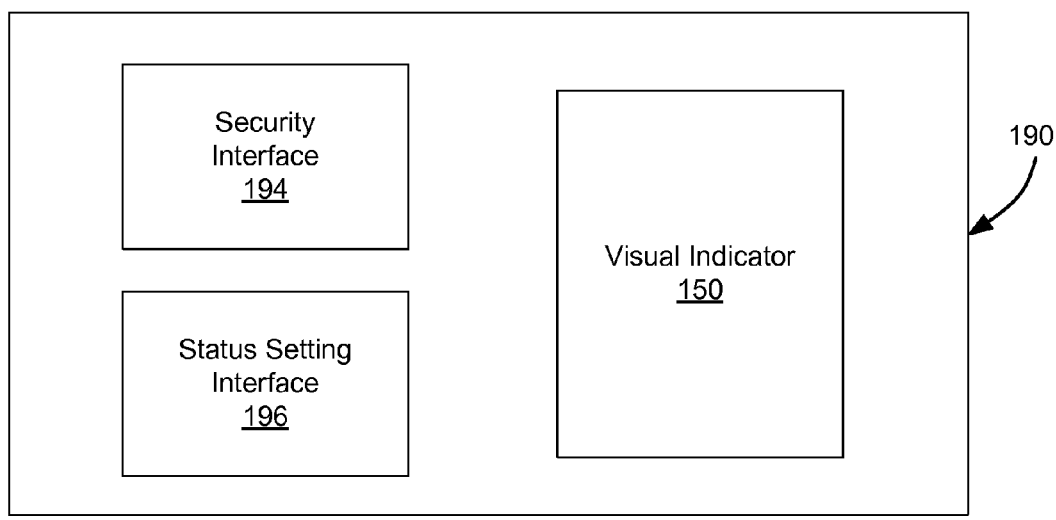
FIG. 9 is a front view illustrating one embodiment of a control module of the system of FIG. 1.

Referring to FIG. 9, in some embodiments, the system 100 includes a control interface 190. The control interface 190 may be positioned within the mobile platform 110 or be located external to the mobile platform. The control interface 190 includes a security interface 194, a status setting interface 196, and a visual indicator 150. In some implementations, the control interface 190 may be a touchscreen. The security interface 194 can be any of various interfaces for receiving security credentials from a user, such as the crew member of a mobile platform. In one implementation, the security interface 194 is a security card reader, such as an RFID scanner, that scans a security card of a user, or a biometric scanner, to receive the security credentials or identification of the user. In yet one implementation, the security interface 194 additionally, or alternatively, includes a keypad for manually entering security credentials, such as ID codes or passwords. In some embodiments, the validation of the security credentials is a required prerequisite before a user can adjust settings of the system 100.

The settings of the system 100 can be adjusted via the status setting interface 196. The status setting interface 196 can include multiple settings available for adjustment. For example, the status setting interface 196 may provide a user the opportunity to set the storage capacity status of one or more storage compartments. The status setting interface 196 may also provide a user the opportunity to activate or deactivate the system 100, such as deactivating the system upon departure of the mobile platform and activating the system during boarding of the mobile platform.

The visual indicator 150 can be any of various visual indicators of the storage capacity status or statuses of one or more storage compartments, such as those described herein. For example, in one embodiment, the visual indicator 150 of the control interface 190 is similar to the visual indicator 150 of FIG. 8.

Referring back to FIG. 1, visual indicators 150 of the system 100 can be any of various visual indicators as described herein, or other visual indicators capable of indicating the storage capacity status of one or more storage compartments. According to one embodiment, the control module 114 receives storage capacity status information regarding the storage compartments on the mobile platform 110 directly or indirectly from volumetric sensors 149 in each of the storage compartments. The control module 114 then communicates over the data network 116 the storage capacity status information to the electronic devices and/or objects of the system 100 with visual indicators 150 remote from the storage compartments of the mobile platform 110. The visual indicators 150 associated with devices and objects external to the mobile platform 110 visually indicate the storage capacity status information to interested parties at locations remote from or external to the mobile platform 110. The system 100 can include fewer, all, or more of the electronic devices and objects shown in FIG. 1.

According to one embodiment, the mobile device 130 is operated by a passenger of the mobile platform 110. Prior to, or during, boarding, the mobile device 130 may access the visual indicator 150 of the mobile platform 110 via a software application to determine the storage capacity status of the storage compartments on the mobile platform 110. Of course, crew members and other personnel may also utilize a mobile device 130 to determine the same or different storage capacity status information.

The computer 132 may be a computer at a gate or check-in counter of an airport. The computer 132 can be operable by airline personnel at the gate, such as a ticketing agent, to access the visual indicator 150 of the computer 132 to determine the storage capacity status of the storage compartments on the mobile platform 110. With the storage capacity status information obtained from the visual indicator 150, the airline personnel can make decisions and institute actions (e.g., requesting passengers check their luggage) that renders the boarding process more efficient. For example, if airline personnel know there are no storage compartments available for storage, the airline personnel may request the checking of luggage for any remaining passengers yet to board.

The monitor 136 may be located in a gate or boarding area of an airport, and viewable to passengers waiting in the gate or boarding area. By viewing the visual indicator 150 of the monitor 136, passengers in the gate or boarding area can determine the storage capacity status of the storage compartments on the mobile platform 110, and make decisions whether to check luggage, before boarding the mobile platform.

Because the storage capacity status of storage compartments changes throughout the boarding process, passengers who have already left the gate or boarding area of the airport and entered the jetway 134 to board the mobile platform 110 may benefit from an initial or additional opportunity to check luggage, or determine which storage compartments are available for storage, while in the jetway before entering the mobile platform 110. Accordingly, in some embodiments, a visual indicator 150 is located in the jetway 134 to be visible by passengers, and others, passing through the jetway. In one implementation, the visual indicator 150 is located near a distal end of the jetway proximate a door of the mobile platform 110. In this manner, a passenger can determine storage capacity status of the storage compartments of the mobile platform 110 just before entering the mobile platform.

Figure 12:
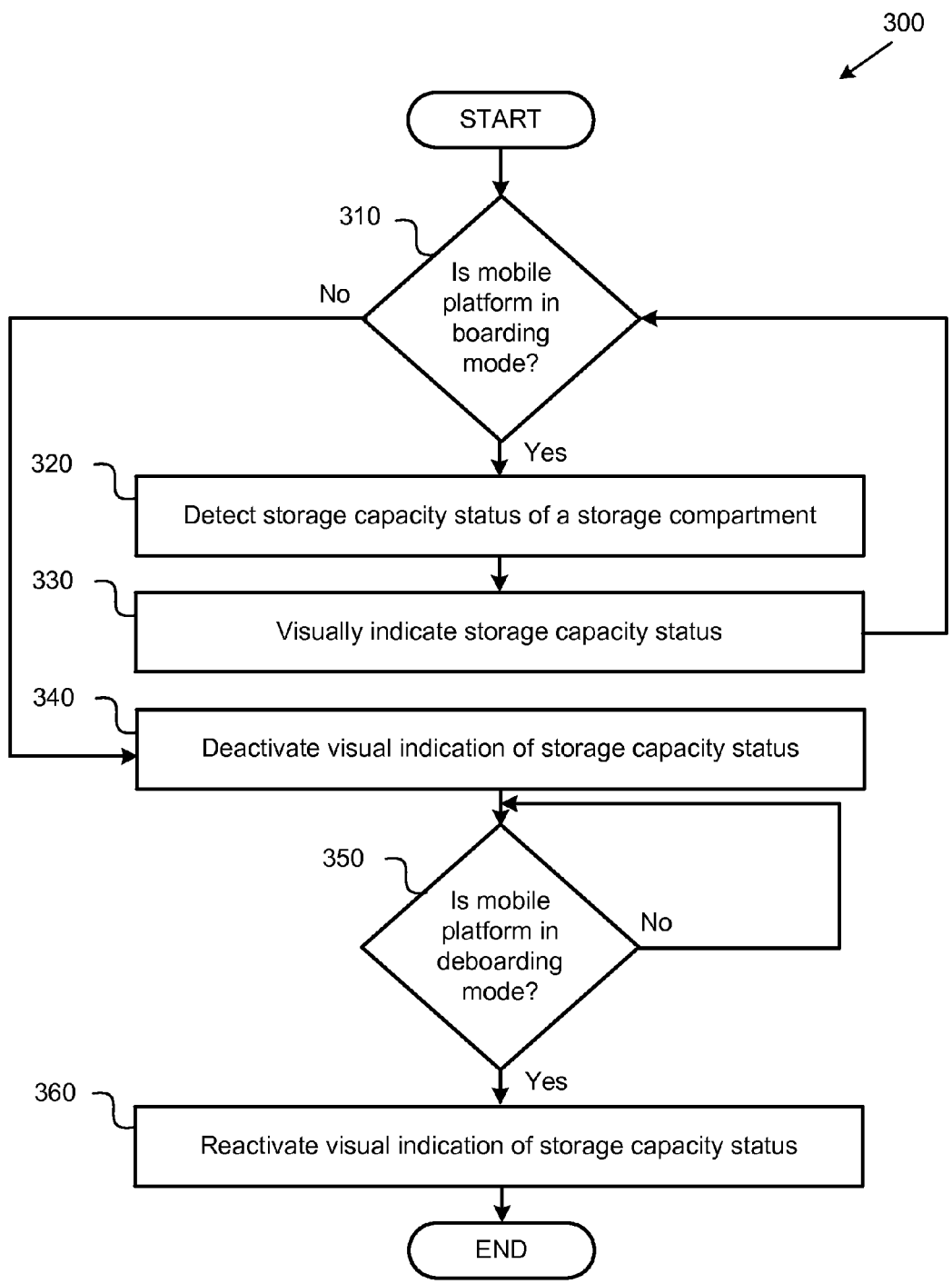
FIG. 12 is a flow diagram illustrating one embodiment of a method of tracking storage capacity status of a storage compartment on a mobile platform.

Referring to FIG. 12, a method 300 of tracking a storage capacity status of a storage compartment of a mobile platform is shown. The method 300 includes determining whether a mobile platform is in a boarding mode at 310. In some implementations, a mobile platform is in the boarding mode while passengers are boarding the mobile platform in preparation for departure. Once the mobile platform has departed or is in transit, the mobile platform is no longer in a boarding mode, and can be considered to be in an in-transit mode. If the mobile platform is in the boarding mode, then the method 300 detects the storage capacity status of at least one storage compartment of the mobile platform at 320. The storage capacity status can be detected manually via a physical inspection by a crew member, or other user, in one implementation. According to some implementations, the storage capacity status is detected automatically or autonomously via a sensor, such as a volumetric sensor. The method 300 further includes visually indicating the storage capacity status of the at least one storage compartment at 330. The storage capacity status visually indicated at 330 is the storage capacity status detected at 320. The storage capacity status can be visually indicated automatically or manually. After visually indicating the storage capacity status at 330, the method 300 returns to determine if the mobile platform is still in a boarding mode at 310. If the mobile platform remains in the boarding mode as determined at 310, then the method 300 continues to detect the storage capacity status of at least cone storage compartment at 320 and visually indicate the storage capacity status at 330 until the mobile platform is no longer in the boarding mode, which implies the mobile platform is in the in-transit mode.

When the mobile platform is not in the boarding mode as determined at 310, the method 300 deactivates the visual indication of the storage capacity status at 340. In other words, when the mobile platform is in the in-transit mode (e.g., an aircraft has left the gate of an airport and/or is in flight), then the visual indication of the storage capacity status is deactivated as visual indications of the storage capacity status may no longer be needed as the boarding process is complete. Alternatively, if desired, in some implementations, the visual indication of the storage capacity status may remain activated during the in-transit mode.

Optionally, in some embodiments, the method 300 determines whether the mobile platform is in a deboarding mode at 350. When the mobile platform is in the deboarding mode, it can be implied that the mobile platform has ceased operation in the in-transit mode (e.g., an aircraft has landed and arrived at the gate of the airport). The method 300 may reactivate the visual indication of the storage capacity status of the at least one storage compartment of the mobile platform at 360 if the mobile platform is in the deboarding mode. Knowing the storage capacity status of the storage compartments of a mobile platform as the deboarding process is initialized may help passengers recognize how full storage compartments are before opening them. Reactivation of the visual indication of storage capacity statuses at 360 may be done automatically based on a sensed location of the mobile platform or manually by one or more crew members.

Figure 10:
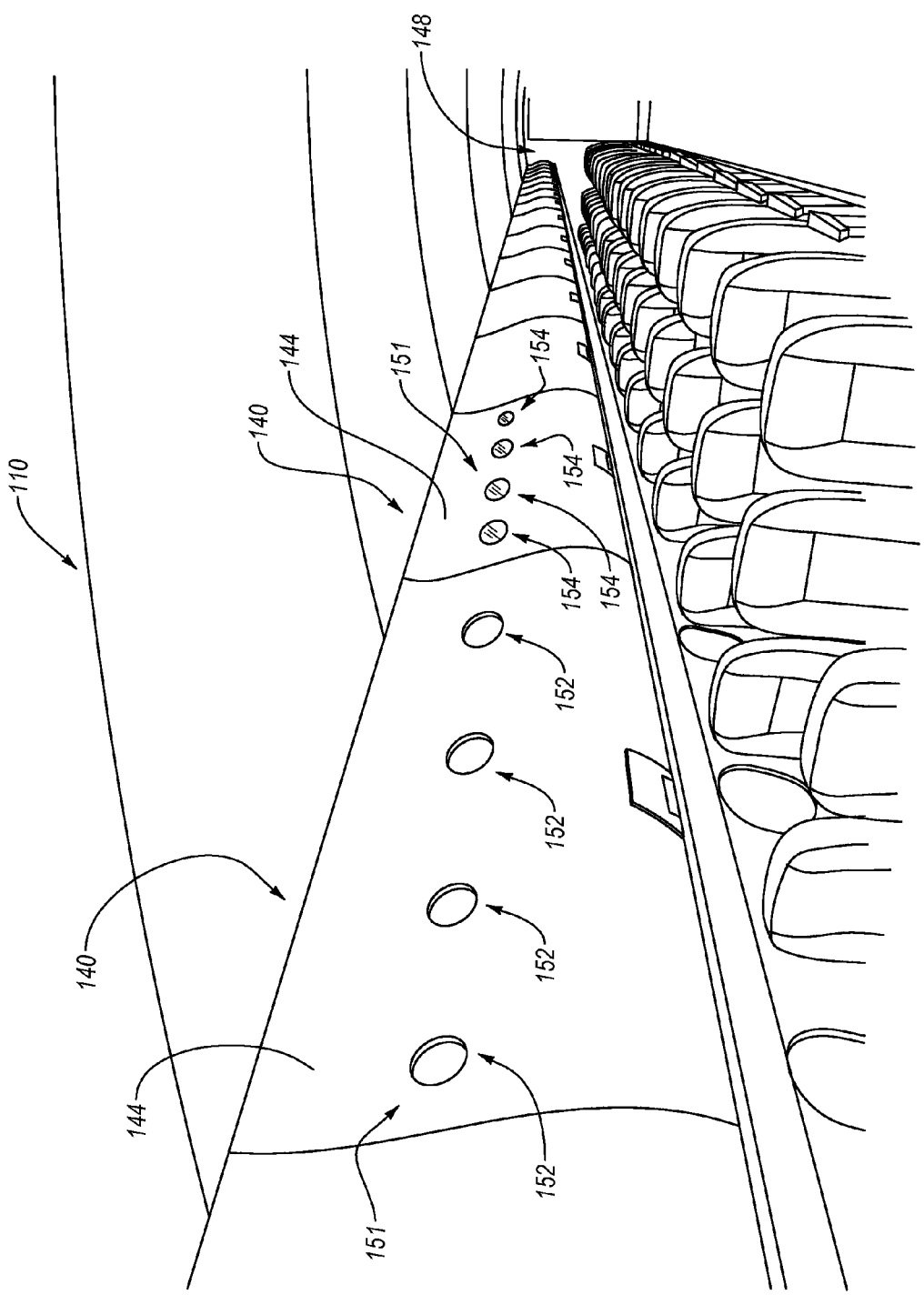
FIG. 10 is a partial perspective view illustrating one embodiment of a mobile platform of the system of FIG. 1.
Figure 11:
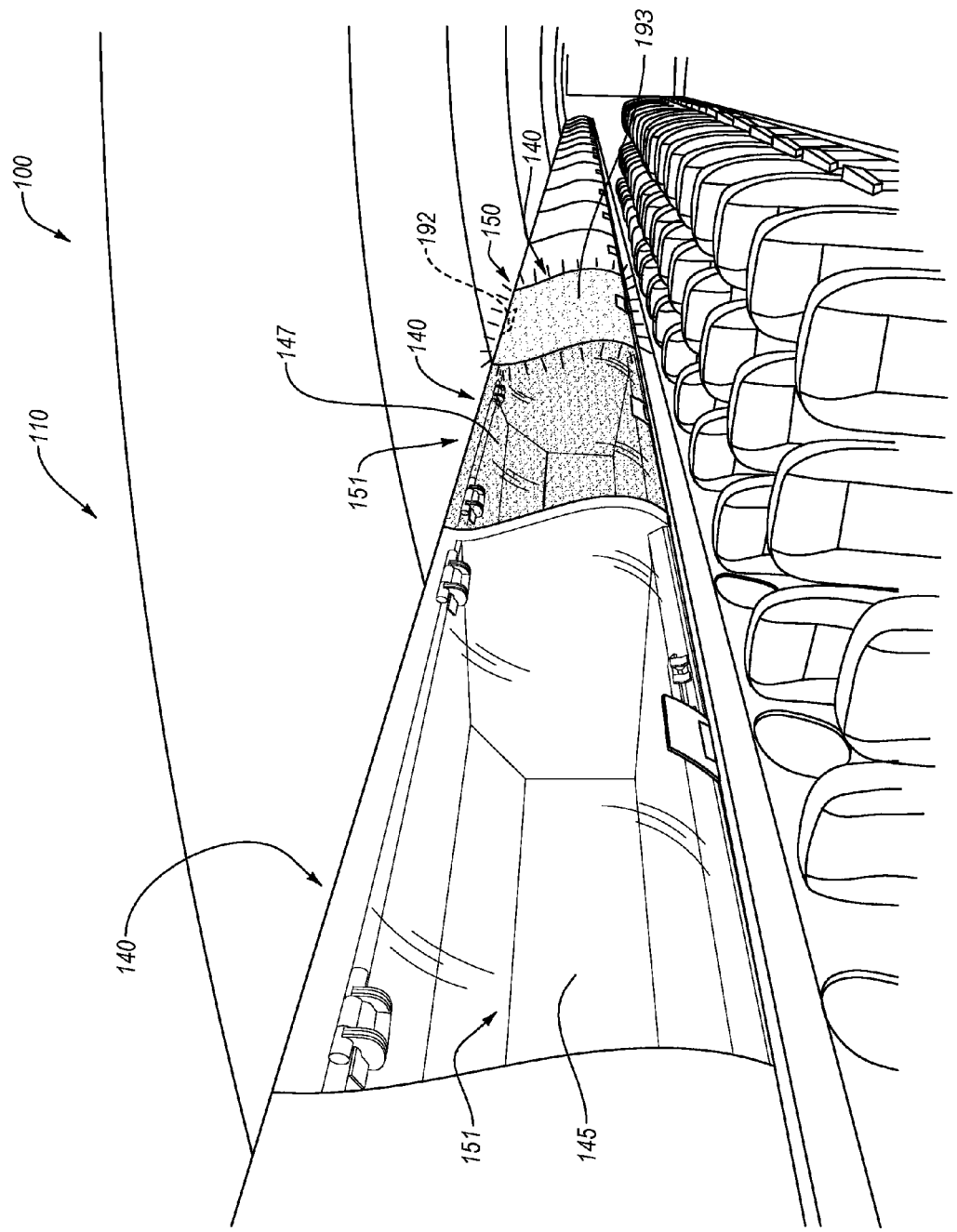
FIG. 11 is a partial perspective view illustrating one embodiment of a mobile platform of the system of FIG. 1.

Referring to FIGS. 10 and 11, visually determining the storage capacity status of storage compartments 140 on mobile platforms 110 without opening the doors of the storage compartments can be accomplished via a visual determination apparatus 151 that provides visual access to the interior space 142 of a storage compartment while the door is closed. For example, in one embodiment, as shown in FIG. 10, one or more apertures 152 formed in the door 144 are sized and spaced relative to each other such that users may discern the storage capacity status of the storage compartment 140 while the door 144 is closed, but luggage stored in the storage compartment is significantly retained within the storage compartment (e.g., does not fall out off or pass through the apertures 152). The apertures 152 can be positioned in sides of the door 144 as shown, or in bottom portions of the door. Alternatively, apertures 152 can be formed in the stationary panels defining the storage compartments, such as in the bottom panel of the storage compartments.

Similar to the apertures 152, windows 154 are formed in the door 144 in some embodiments (see FIG. 10). The windows 154 include an aperture covered with an at least partially panel made from an at least partially transparent material, such as plastic or glass. The windows 154 may be formed in the door or in other structures (e.g., bottom panel) defining the storage compartments 140. The windows 154 can provide similar ease in discerning the storage capacity status as the apertures 152, but also ensure luggage is retained within the storage compartment.

Referring to FIG. 11, a door 145 made from a transparent material, such as clear plastic or glass, can provide for a visual determination of the storage capacity status of storage compartments 140 on mobile platforms 110 without opening the door of the storage compartment. As shown, the entire door 145 is made from the transparent material. Alternatively, or additionally, another structure forming the storage compartment 140, such as a bottom panel, can be made from a transparent material. In this manner, a user may see through the transparent material to clearly view the storage capacity status of the storage compartment 140.

According to another embodiment shown in FIG. 11, a door 147 made from a translucent or semi-transparent material, such as a frosted plastic or glass, can provide for a visual determination of the storage capacity status of storage compartments 140 on mobile platforms 110 without opening the door of the storage compartment. The entire door 147 can be made from the translucent material. Alternatively, or additionally, another structure forming the storage compartment 140, such as a bottom panel, can be made from a translucent material. In this manner, a user may see through the translucent material to get an idea of the storage capacity status of the storage compartment 140, while allowing at least some level of privacy for the contents of the storage compartment and/or providing for a more aesthetically pleasing storage compartment.

Also shown in FIG. 11, and according to one embodiment, the visual indicator 150 can be provided by a coloration system that includes a door 193, or other structure, of the storage compartment 140 that illuminates based on a storage capacity status of the storage compartment. The door 193 may be made from an at least partially transparent material that allows for the passage of light therethrough. Further, the coloration system may include a color control device 192 operatively coupled to the door 193 to illuminate the door a desired color associated with the storage capacity status of the storage compartment. For example, the door 193 may illuminate red for a storage capacity status of unavailable and green for a storage capacity status of available. In some implementations, the entire door 193 or other structure of the storage compartment 140 is illuminated. The color control device 192 may control the color of the door 193 by controlling the color of light illuminating the door. The light may be transmitted through the door 193 via a series of mirrors or reflective surfaces, or other means as may be known in the art.

As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing.

In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions, etc.

Aspects of the embodiments may be described above with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A system for a mobile platform, comprising:
   a storage compartment defining an interior space, the storage compartment forming part of the mobile platform and being operable to physically separate the interior space from an exterior space; and
   a visual indicator providing to the exterior space a visual indication of a storage capacity status of the interior space of the storage compartment by applying a coloration to illuminate a door of the storage compartment, the coloration visible from the exterior space.

2. The system of claim 1, wherein the visual indicator further comprises a mechanical display switchable between at least a first configuration indicating a first storage capacity status of the interior space of the storage compartment and a second configuration indicating a second storage capacity status of the interior space of the storage compartment.

3. The system of claim 1, wherein the visual indicator comprises a light source to generate light to illuminate the door.

4. The system of claim 3, wherein the light is switchable between a first color indicating a first storage capacity status of the interior space of the storage compartment and a second color indicating a second storage capacity status of the interior space of the storage compartment.

5. The system of claim 1, wherein the visual indicator further comprises an electronic display.

6. The system of claim 5, wherein the electronic display displays a percentage of a storage capacity of the interior space of the storage compartment.

7. The system of claim 1, wherein the visual indicator is coupled to the storage compartment.

8. The system of claim 7, wherein:
   the door of the storage compartment comprises a movable partition, the movable partition at least partially defining the interior space; and
   the visual indicator being coupled to the movable partition.

9. The system of claim 1, further comprising a volumetric sensor that detects the storage capacity status of the interior space of the storage compartment.

10. The system of claim 9, wherein the visual indicator is operably coupled to the volumetric sensor to automatically provide the visual indication of the storage capacity status of the interior space of the storage compartment based on input from the volumetric sensor.

11. The system of claim 10, wherein the volumetric sensor wirelessly transmits the input to the visual indicator.

12. The system of claim 1, wherein:
   the visual indicator switches a color of the storage compartment between a first color and a second color; and
   the first color indicates a first storage capacity status of the interior space of the storage compartment and the second color indicates a second storage capacity status of the interior space of the storage compartment.

13. The system of claim 1, wherein the visual indicator further comprises a remote visual indicator that is remote from the storage compartment.

14. The system of claim 13, wherein the remote visual indicator is positioned in a crew work space of the mobile platform.

15. The system of claim 13, wherein the remote visual indicator is positioned external to the mobile platform.

16. The system of claim 13, wherein the remote visual indicator comprises an electronic display of a mobile device.

17. The system of claim 1, further comprising a plurality of storage compartments each defining an interior space and each operable to physically separate a corresponding portion of the interior space from the exterior space, wherein the visual indicator provides to the exterior space a visual indication of the storage capacity status of the interior space of each of the plurality of storage compartments.

18. A system for tracking a storage capacity status of a storage compartment of a mobile platform, comprising:
   a volumetric sensor that detects the storage capacity status of the storage compartment;
   a control module operably coupled to the volumetric sensor to receive the storage capacity status from the volumetric sensor; and
   a visual indicator operably coupled to the control module, the visual indicator including a mechanical display to display physical indicia providing a visual indication of the storage capacity status of the storage compartment in response to a command from the control module.

19. A method of tracking a storage capacity status of a storage compartment of a mobile platform, comprising:
   detecting the storage capacity status of the storage compartment; and
   visually indicating the storage capacity status of the storage compartment on an electronic display screen of the storage compartment based on the detected storage capacity status.

20. The method of claim 19, further comprising visually indicating the storage capacity status of the storage compartment to a location external to the mobile platform.

21. A system for a mobile platform, comprising:
   a storage compartment defining an interior space, the storage compartment forming part of the mobile platform, wherein the storage compartment comprises a door movable relative to the interior space between an open position and a closed position, the door physically separating the interior space from an exterior space in the closed position; and
   a visual determination apparatus coupled to the storage compartment, the visual determination apparatus providing to the exterior space visual access to the interior space of the storage compartment when the door is in the closed position.

* * * * *